Figure 1:
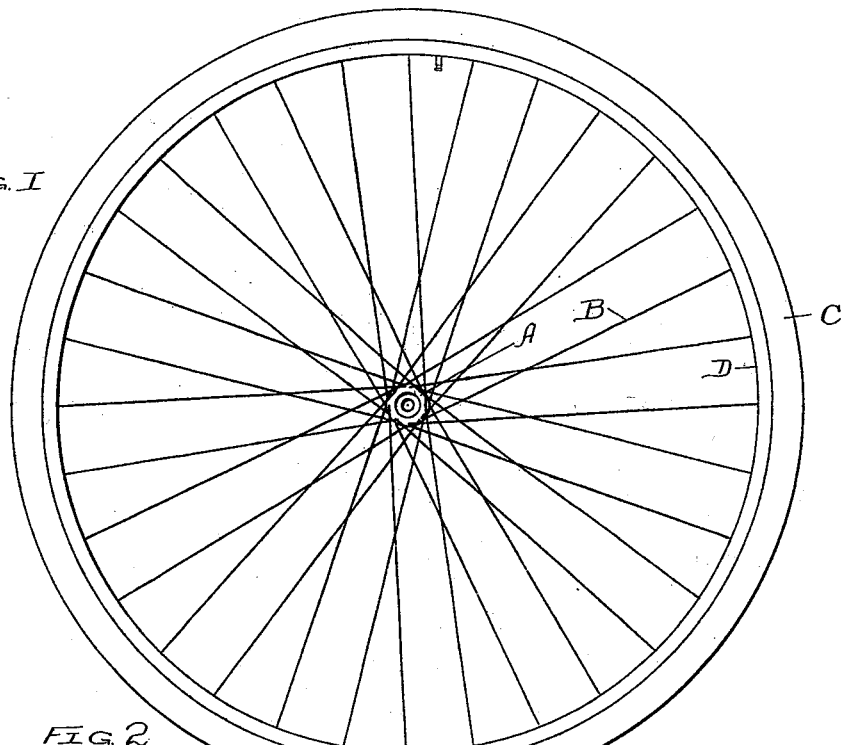

(No Model.)

G. W. MARBLE.
BICYCLE WHEEL.

No. 595,831. Patented Dec. 21, 1897.

WITNESSES:

INVENTOR:
GEORGE W. MARBLE
BY Munday, Evarts & Adcock,
HIS ATTORNEYS.

UNITED STATES PATENT OFFICE.

GEORGE W. MARBLE, OF PLYMOUTH, INDIANA, ASSIGNOR TO THE INDIANA NOVELTY MANUFACTURING COMPANY, OF SAME PLACE.

BICYCLE-WHEEL.

SPECIFICATION forming part of Letters Patent No. 595,831, dated December 21, 1897.

Application filed June 4, 1897. Serial No. 639,381. (No model.)

*To all whom it may concern:*

Be it known that I, GEORGE W. MARBLE, a citizen of the United States, residing at Plymouth, in the county of Marshall and State of Indiana, have invented a new and useful Improvement in Wood-Rim Pneumatic-Tire Suspension-Spoke Bicycle-Wheels, of which the following is a specification.

My invention relates to improvements in wood-rim pneumatic-tire suspension-spoke bicycle-wheels.

The object of my invention is to perfect such wheels and to increase their durability and strength or capability for resisting the various different kinds of strains to which such wheels are subjected in use, especially at the joint uniting the meeting ends of the wood rim of the wheel, while at the same time enabling the wheel to be made of a simple and cheap construction and of the required lightness in weight. To accomplish this result, I make the wood rim of the wheel of a solid or single strip of wood bent to circular form and of the required crescent or channeled shape in cross-section to receive the pneumatic tire and having its meeting ends spliced or joined together by a series of interfitting tongues and grooves extending in the plane of the wheel, the ends of the tongues on one end abutting against the ends or bottoms of the grooves on the other end of the rim. To enable the wheel to properly resist, as a continuous circular arch, the great compression strains due to the tension or suspension spokes and the compression exerted by the pneumatic tire, and by the extended glue-surface produced by the numerous interglued side faces of the interfitting tongues to properly resist the flexure or displacement strains at the joint, and also the tensile or separating strains exerted upon the wheel through the driving mechanism of the bicycle, and to further perfect and strengthen the joint, and especially against flexure or displacement strains and further increase the interglued surfaces uniting the two ends of the rim of the wheel together, I provide the wheel at the joint of the wood rim with a splice-piece extending across and lengthwise of the interfitting tongue-joint. This splice-piece is preferably provided with double dovetail side edges which fit in corresponding dovetail grooves formed in the rim. The splice-piece is preferably made in length about three times the length of the interfitting tongues and is preferably inserted in the outer curved face of the rim. By this means all danger or possibility of the wheel giving way at the joint of the wood rim under any possible flexure, displacement, twisting, wrenching, or other strains to which it may be subjected in use is obviated, while at the same time the cost of the wheel or rim is not materially increased, and its lightness and easy-riding characteristics are also increased or fully maintained.

Figure 2:
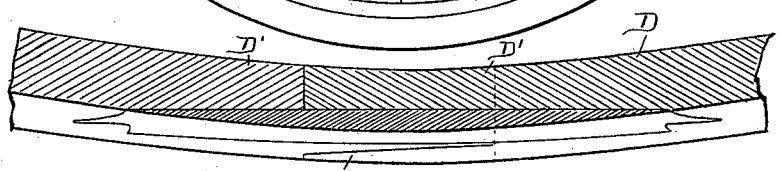
Figure 3:
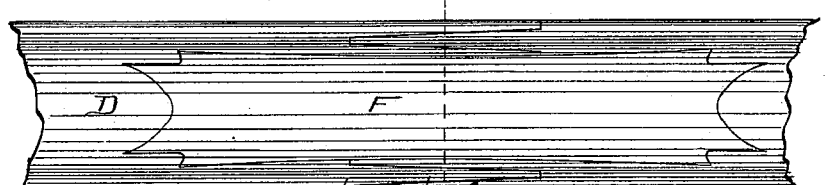
Figures 4, 5:
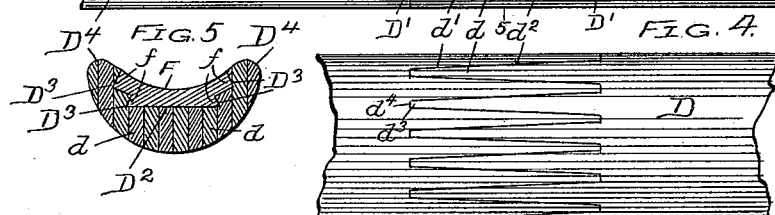

In the accompanying drawings, forming a part of this specification and in which similar letters of reference indicate like parts, Figure 1 is a side elevation of a pneumatic-tire suspension-spoke bicycle-wheel embodying my invention. Fig. 2 is an enlarged detail central section in the plane of the wheel at the interfitting tongue-joint of the wood rim. Fig. 3 is a detail plan view looking at the outer concaved face of the wood rim at the joint portion thereof. Fig. 4 is a similar plan view looking at the inner convex face of the wood rim, and Fig. 5 is a cross-section on the line 5 5 of Fig. 3.

In the drawings, A represents the hub of the wheel; B, its tension or suspension spokes; C, its pneumatic tire, and D the wood rim.

The wood rim D is preferably formed of a single continuous strip of wood bent to circular form and of the required channeled or crescent shape in cross-section to receive the pneumatic tire C. The meeting ends D' D' of the wood rim D are each provided with a series of interfitting tongues and grooves $d$ $d'$, the interfitting side faces $d^2$ of which extend, preferably, in the plane of the wheel and the ends $d^3$ of the tongues $d$ on the one end abutting against the ends or bottoms $d^4$ of the grooves $d'$ on the other end of the rim. The interfitting side faces of the tongues $d$ $d$ are firmly glued together.

After the wood strip from which the rim D is formed is bent into circular form and its meeting ends provided with interfitting tongues $d$ $d$ and the same firmly compressed and glued together and before this circular blank is turned or shaped into the required crescent or channeled shape in cross-section I form a channel or receptacle $D^2$ partially in each of the meeting ends $D'$ $D'$ of the rim and extending longitudinally of the joint. This channel or receptacle $D^2$ is preferably provided with double dovetail depressions $D^3 D^3$ at its sides to better distribute the strain and diminish the liability of the horns $D^4 D^4$ of the crescent-shaped rim in cross-section to split or separate. This will be readily understood from Fig. 5 by those skilled in the art, and I then insert in this channel or receptacle $D^2$ a splice-piece F, the same being preferably in length about three times the length of the tongues $d$ and extending tangentially across the interfitting tongue-joint of the rim, as is clearly indicated in Figs. 2 and 3 of the drawings. This splice-piece F is preferably provided with double dovetail projections $f f$ at its sides. After the splice-piece F has been thus inserted and glued in place the circular rim-blank is turned to the required channeled or crescent shape in cross-section. This gives the splice-piece F, of course, the curvature of the inside of the rim or its outer face in cross-section, as well as in the direction of the circumference of the rim. The outer face of the splice-piece thus has a double curvature the same as the rim, and it tapers to feather-edges at its ends, as is clearly indicated in Figs. 2 and 3.

I claim—

1. The combination with a pneumatic tire and suspension-spokes, of a wood rim having at its joint or meeting ends a series of interfitting tongues and a splice-piece extending longitudinally of the joint, said splice-piece having double dovetail side edges, substantially as specified.

2. The combination with a pneumatic tire and suspension-spokes, of a wood rim having at its joint or meeting ends a series of interfitting tongues and a dovetail splice-piece extending longitudinally of the joint, substantially as specified.

3. The solid-piece wood rim D having interfitting tongues $d$ at its meeting ends, and a dovetail splice-piece extending longitudinally of the joint, substantially as specified.

4. The wood rim D having interfitting tongues $d d$ on its meeting ends and provided with a longitudinally or tangentially extending dovetail groove formed partially in each of the two meeting ends of the rims, and a dovetail splice-piece F fitting in said dovetail groove, said splice-piece having on its outer face the double curvature of the rim, substantially as specified.

5. A wood rim for a bicycle-wheel having a longitudinally or tangentially extending dovetail groove formed partially in each of the meeting ends of the rim, and a dovetail splice-piece fitting in said groove, substantially as specified.

6. A wood rim for a bicycle-wheel having a longitudinally or tangentially extending dovetail groove formed partially in each of the meeting ends of the rim, and a dovetail splice-piece fitting in said groove, said groove having double dovetail depressions at its side edges and splice-pieces having double dovetail projections at its side edges, substantially as specified.

GEORGE W. MARBLE.

Witnesses:
H. M. MUNDAY,
JOHN W. MUNDAY.